3,317,457
COATING COMPOSITIONS OF VINYL AROMATIC-MALEIC HALF ESTER COPOLYMERS, EPOXY RESINS AND UREA FORMALDEHYDE RESINS
Robert L. Zimmerman and James R. Harvey, Midland, Mich., assignors to The Dow Chemical Company, Midland, Mich., a corporation of Delaware
No Drawing. Filed Aug. 23, 1962, Ser. No. 218,821
2 Claims. (Cl. 260—39)

This invention concerns coating compositions and more particularly relates to liquid coating compositions in which the essential organic film-forming material is a mixture of a xylene soluble copolymer of one or more monovinyl aromatic compounds and a maleic acid half ester, together with an epoxy resin, e.g. a diglycidyl ether of a bisphenol, and a minor proportion of an amino triazine-formaldehyde-butyl alcohol condensate, a urea-formaldehyde-butyl alcohol condensate, or a mixture thereof.

U.S. Patent 2,967,162 makes coating compositions directed to baking enamels for electrical appliances such as refrigerators, freezers, washing machines and clothes driers, and for related articles such as kitchen cabinets. There is continued search for coatings having improved properties such as adhesion, gloss, flexibility, resistance to abrasion and to grease, fumes, foods, soaps, detergents, and other chemicals, and to liquid coating compositions which possess good stability or resistance to gelling or thickening upon storing for prolonged periods of time.

It is a primary object of the invention to provide new polymeric coating compositions having an improved balance of the properties required in the above-mentioned end uses. Another object is to provide liquid coating compositions of the baking type which are generally useful in the baked organic coating art, and which liquid coating compositions possess good stability upon storing for prolonged periods of time. Other and related objects may become apparent from the following description of the invention.

According to the invention the new liquid coating compositions are pigmented, or clear (unpigmented), compositions in which the essential organic film-forming material consits of from about 80 to 97, preferably from 80 to 90, percent by weight of a mixture of a xylene soluble copolymer of from 70 to 96 mole percent of a monovinyl aromatic compound, e.g. styrene, vinyltoluene, chlorostyrene and the like, and correspondingly from 30 to 4 mole percent of a partial ester of maleic anhydride in which at least 35 percent but not more than 55 percent of the carboxyl equivalents are esterified with a hydroxy compound selected from the group consisting of aromatic and saturated, preferably branched chain, aliphatic alcohols containing from 7 to 21 carbon atoms in the molecule and having a primary or secondary hydroxyl group, and aliphatic ether alcohols having the general formula:

$$HO—(C_nH_{2n}O)_m—R$$

wherein R is an alkyl radical containing from 1 to 4 carbon atoms, $n$ is a whole number from 2 to 3 and $m$ is an integer from 1 to 3, and an epoxy resin such as a diglycidyl ether of a bisphenol, an epoxidized drying oil, or a cycloaliphatic epoxy resin having an epoxide equivalent weight between about 110 and 550, preferably from 170 to 400, in proportions of about 0.5 to 2, preferably from 0.9 to 1.1, chemically equivalent proportions of said epoxy resin per carboxylic acid group in the copolymer, with from 20 to 3, preferably from 20 to 10, percent by weight of a thermosetting alcohol-modified amino resin selected from the class consisting of the amino triazine-formaldehyde-butyl-alcohol condensates, such as benzyl-guanamine-formaldehyde-butyl-alcohol, acetguanamine-formaldehyde-butyl-alcohol or melamine-formaldehyde-butyl-alcohol condensates, and urea-formaldehyde-butyl alcohol condensates, or mixtures thereof, the said film-forming material being in solution in a volatile organic solvent or a mixture of organic solvents therefor.

The xylene soluble copolymer starting material can be a copolymer of from 70 to 96, preferably from 75 to 90, mole percent of a monovinyl aromatic compound having the general formula

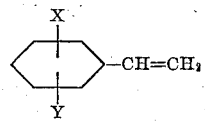

wherein X and Y each represent a member of the group consisting of hydrogen, halogen and the methyl radical, e.g. styrene, vinyltoluene, vinyl xylene, bromostyrene, fluorostyrene, dichlorostyrene, and the like, and correspondingly from 30 to 4, preferably from 20 to 10 mole percent of a partial ester of maleic anhydride and a hydroxy compound that is a member of the group consisting of aromatic and saturated, preferably branched chain, aliphatic alcohols having a primary hydroxyl group and containing from 7 to 21 carbon atoms in the molecule, such as benzyl alcohol, 2,4-dichlorobenzyl alcohol, 2-methylpentanol-1, 3-methylolpentane, 2-methylhexanol-1, 2 - methylhexanol - 6, 2 - ethylhexanol-1, 2,6-dimethyl-3-methylolheptane, and the like, and ether alcohols such as the monoalkyl ethers of mono-, di- or tri-ethylene glycol or mono-, di- or tri-propylene glycol containing a primary hydroxyl group and wherein the alkyl group contains from 1 to 4 carbon atoms.

The xylene soluble copolymers can be prepared in any of several known ways. For example, the monomeric monovinyl aromatic compound, e.g. styrene, can be placed in a suitable reaction vessel equipped with a reflux condenser and stirrer, together with a solvent such as xylene as reaction medium. The mixture is stirred and heated at temperatures between about 90° and 160° C. with up to 30 percent of the desired quantity of a half-ester of maleic acid such as isooctyl acid maleate and then adding uniformly or in small increments the remaining portion of the half-ester of maleic acid at a linear overall rate so that the conversion of monomer to polymer is between 70 and 90 percent at the end of the addition. Heating of the resulting mixture is continued until polymerization is complete or substantially complete. The copolymer may be recovered in usual ways, e.g. by distillation of the volatile ingredients under vacuum, or it can be used per se as a solution in the solvent in which it was prepared.

In an alternative embodiment the xylene soluble copolymers are prepared by polymerization of a mixture of the monomers, i.e., the vinyl aromatic compound and the acid half-ester of maleic acid or maleic anhydride, by feeding the monomers dissolved in an inert solvent such as xylene, or methyl ethyl ketone, advantageously with a free radical polymerization catalyst, to a reaction vessel, e.g., a recirculating coil, wherein the mixture of materials is heated to temperatures within the range of from 90° to 160° C. or higher, to copolymerize the monomers, while continuously withdrawing material from the reaction zone. The copolymer may be isolated by separating the volatile material and the polymer product from one another. When the conversion of monomer to copolymer is at least 70 percent the withdrawn material can be heated en masse to substantially complete the polymerization and form a soluble product.

A maleic anhydride copolymer prepared by the above continuous method is reacted with an alcohol to form the corresponding partial ester of maleic acid.

The copolymers should have a viscosity characteristic corresponding to from 0.5 to 5, preferably from 1 to 2.5, centipoises as determined for a 10 weight percent solution of the copolymer in methyl ethyl ketone at 25° C.

The copolymers of the vinyl aromatic compounds and the half-esters of maleic acid or anhydride suitable for making the coating compositions of the invention are the xylene soluble copolymers containing in chemically combined form from 70 to 96, preferably from 80 to 90, mole percent of one or more monovinyl aromatic compounds having the general formula

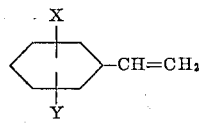

wherein X and Y each represents a member of the group consisting of hydrogen, halogen and the methyl radical, and correspondingly from 30 to 4, preferably from 20 to 10, mole percent of maleic anhydride in which at least 35 but not more than 55 percent of the carboxyl equivalents are esterified with an aromatic or a saturated aliphatic alcohol containing from 7 to 21 carbon atoms in the molecule, and preferably a branched chain saturated aliphatic alcohol such as isooctyl alcohol or 2-ethylhexyl alcohol, or a half-ester of maleic acid or maleic anhydride and an ether alcohol having the general formula:

$$HO-(C_nH_{2n}O)_m-R$$

wherein R is an alkyl radical containing from 1 to 4 carbon atoms, $n$ is a whole number from 2 to 3 and $m$ is an integer from 1 to 3.

Examples of suitable monovinyl aromatic compounds are styrene, vinyltoluene, vinyl xylene, monochlorostyrene, fluorostyrene, bromostyrene, dichlorostyrene, dibromostyrene, ar-chlorovinyltoluene and ar-chlorobromostyrene. Examples of suitable alcohols and ether alcohols for reacting with maleic acid or maleic anhydride to form the half-esters or acid esters of the same are benzyl alcohol, 2,4-dibromobenzyl alcohol phenethyl alcohol, heptyl alcohol, octyl alcohol, isobutyl alcohol, 2-ethylhexyl alcohol, 2-methyl-4-ethylhexanol, 2,6-dimethylheptanol, 4-ethylheptanol, 2-methyloctanol, nonyl alcohol, and as ether alcohols the mono methyl, ethyl, propyl and butyl ethers of mono-, di- or tri-ethylene glycol, or of mono-, di- and tri-propylene glycol.

The epoxy resins to be employed can be a glycidyl ether of a bisphenol such as bisphenol-A or a halogenated bisphenol such as tetrachlorobisphenol or tetrabromobisphenol, or an epoxidized drying oil such as epoxidized soybean oil, epoxidized linseed oil, or a glycidyl ether of cashew nut oil, or an epoxy novolac resin as well as cycloaliphatic epoxy resins such as 3,4-epoxy-6-methylcyclohexyl-3,4-epoxy - 6 - methylcyclohexane carboxylate, which epoxy resin has an epoxy equivalent weight between 110 and 550, preferably between 170 and 400. Mixtures of any two or more of such epoxy resins can be used. The epoxy resins are used in an amount corresponding to from 0.5 to 2.0, preferably from 0.9 to 1.1, epoxy equivalent weights per carboxylic acid group in the vinyl aromatic acid maleate copolymer starting material employed.

The amino resins to be employed are the soluble butylated urea-formaldehyde resins and the butylated aminotriazine-formaldehyde resins such as the butylated melamine-formaldehyde resins. The amino resins are employed in amounts corresponding to from 3 to 20 percent by weight with correspondingly from 97 to 20 percent by weight of the sum of the weights of the mixture of the copolymer of the vinyl aromatic compound and the partial ester of maleic acid and the epoxy resin.

The compositions are prepared by blending the ingredients in a suitable solvent or mixture of solvents therefor, together with a pigment such as titanium dioxide, barium sulfate, zinc oxide and the like, preferably titanium dioxide. Suitable solvents are aromatic solvents such as Penola 100 or 150 or Solvesso 100 or 150, toluene, xylene, and suitably with admixture of ketones such as acetone, methyl ethyl ketone, methyl isobutyl ketone, ethyl acetate, ethylpropionate, ethyl alcohol, butyl alcohol, dimethyl formamide and the like. The solvents are used in an amount such as to form a solution of the film forming ingredients and/or the pigment suitable for application by spraying, brushing, dipping and the like which can be dried and baked to form hard adherent tough coatings that are resistant to attack by solvents and soap or detergent cleaning solutions. The compositions of the invention when dried and cured by baking, e.g., by heating in an oven at 300–350° F. for from 30 to 180 minutes form hard glossy adherent coatings having high resistance to solvents, food products and comestibles as well as good resistance to soap and cleaning solutions and are useful for a variety of purposes such as baking enamels for electrical appliances, kitchen cabinets, clothes driers, washing machines, refrigerators and related articles.

The following examples illustrate ways in which the principle of the invention has been applied, but are not to be construed as limiting its scope.

EXAMPLE 1

(A) A charge of 45 pounds of monomeric styrene, together with 35.05 pounds of xylene as solvent and reaction medium, was placed in a glass-lined reaction vessel equipped with a stirrer and reflux condenser and a jacket for passing a heating or cooling liquid therethrough. A charge of 4.25 pounds of a feed mixture consisting of 15 pounds of isooctyl acid maleate, i.e. the half-ester of maleic anhydride and isooctyl alcohol, 4.95 pounds of xylene, and 0.22 pound of di-tert.-butyl peroxide and 0.22 pound of tert.-butyl hydroperoxide, as mixed polymerization catalyst or initiator, was added. The resulting mixture was stirred and was heated to a temperature of 90° C. Thereafter, the remaining portion of the feed mixture was added to the reaction vessel in continuous manner over a period of one hour while stirring and maintaining the mixture at temperatures which were for the most part within the range of from 139° to 151° C. After addition of all of the feed mixture, stirring and heating was continued for a period of 1.5 hours longer. A portion of the mixture was withdrawn and was analyzed. Polymerization of the monomers was 97 percent complete. The mixture was a transparent colorless solution of the copolymer dissolved in the xylene solvent reaction medium. A portion of the solution was heated in vacuum to vaporzie and remove the volatile ingredients and recover the copolymer. The copolymer was a transparent brittle solid consisting of 75 percent by weight of styrene and 25 percent by weight of isooctyl acid maleate. This corresponds to 86.8 mole percent styrene and 13.2 mole percent isooctyl acid melate. A 10 weight percent solution of the copolymer in methyl ethyl ketone had an absolute viscosity of 1.34 centipoises at 25° C.

(B) A coating composition was prepared by first making a pigment dispersion by pebble mill grinding a mixture of 124.6 parts by weight of the copolymer of styrene and isooctyl maleate, prepared in part A above, 294.2 parts of $TiO_2$ pigment, 49 grams of mono-methyl ether of ethylene glycol and 124.6 parts of xylene to form a smooth paste. To the pigment dispersion there was added 181.4 parts by weight of a 50 weight percent solution of the copolymer of styrene and isooctyl maleate dissolved in xylene, 89.7 parts by weight of a solution of 60 percent by weight of epoxy resin consisting essentially of diglycidyl ether of bisphenol A having an epoxide equivalent weight of about 260, dissolved in ethylene glycol monoethyl ether acetate, 46.1 parts by weight of a 65 percent by weight solution of a butylated melamine-formaldehyde resin dissolved in xylene, 35.9 parts by weight of ethylene glycol monoethyl ether acetate, 58.3 parts by weight of butyl alcohol, 15.2 parts of xylene and 22.4 parts of an aromatic hydrocarbon solvent having a boiling range of 186–215° C. at atmospheric pressure. The resulting mixture was blended in the pebble mill to a uniform composition, then was removed and strained. The coating composition contained 72 percent by weight of the copolymer of styrene and isooctyl maleate, 18 percent of epoxy resin and 10 percent of butylated melamine formaldehyde resin. The composition had a viscosity of about 66 (Krebs units). The composition was coated onto 25 mil unpolished steel test panels and was dried. The dried layer was baked in an oven at a temperature of 350° F. for a period of 30 minutes. The coating had a front impact value of 24 inch pounds, a flexibility of about 0.1½ inch failure as determined by bending a 4-inch wide test panel around a conical mandrel (apex at 0), a Knoop Hardness of 39 and a gloss of 98 (60° photo-volt). The coating had good resistance to discoloring or deterioration from grease, alkaline soaps, detergents, foods, kitchen fumes and heat. The coating composition had good shelf life as determined by prolonged storage at room temperature. For example, the coating composition had a viscosity of 66 Krebs units as initially prepared. After storing at room temperature for 14 weeks the viscosity was 72 Krebs units, and after 5 months was 78 Krebs units.

(C) A coating composition possessing similar properties was prepared employing the procedure employed in part B above, except using a butylated urea-formaldehyde resin in place of the butylated melamine-formaldehyde resin employed in said experiment.

(D) Similar results were obtained in a coating composition prepared according to part B above, except using a butylated benzoguanamine-formaldehyde resin in place of the butylated melamine-formaldehyde resin used in said example.

EXAMPLE 2

A mixture consisting of 75 parts by weight of monomeric styrene and 25 parts by weight of the half-ester of maleic acid and monobutyl ether of diethylene glycol, together with 0.25 part by weight of di-tert.-butyl peroxide and 0.25 part by weight of tert.-butyl hydroperoxide, as polymerization initiator, per 100 parts by weight of the monomers, and 50 parts by weight of xylene as solvent and reaction medium, was fed to a recirculating coil reactor, having a capacity of about 15 pounds of the feed mixture, at a rate of about 4 pounds per hour. The mixture was circulated rapidly in the coil reactor so as to quickly blend or mix the incoming feed material throughout the reacting mass. The reaction was carried out by continuously feeding to, and continuously withdrawing from, the recirculating coil reactor, material such that the product withdrawn contained approximately 50 percent by weight of polymer. The solution withdrawn from the reaction coil was mixed with 0.26 percent by weight of benzoyl peroxide, based on the weight of the monomers initially used, then was heated in a sealed container at a temperature of 80° C. for a period of 24 hours to complete the polymerization. Thereafter, the container was opened and the solution was analyzed. It was found to consist of 66 percent by weight of copolymer. The product was a copolymer consisting of 88.5 mole percent of styrene and 11.5 mole percent of the half-ester of maleic acid and monobutyl ether of diethylene glycol. The copolymer was a transparent brittle solid. It was soluble in xylene, toluene and in aromatic-type lacquer or enamel solvents.

EXAMPLE 3

(A) A mixture consisting of 72 percent by weight of monomeric styrene, 13 percent of maleic anhydride and 15 percent of acetone was fed in continuous manner to a recirculating coil reactor, having a capacity of about 3 pounds of material, at a rate of 1.8 pounds per hour wherein it was heated at a temperature of 132° C., while continuously withdrawing liquid from the coil reactor at about the rate of feed thereto. The reaction was carried out so as to maintain the coil reactor full or substantially full of liquid containing about 45 percent by weight of polymer. The material withdrawn from the coil reactor in continuous manner was passed to a devolatizing zone wherein it was heated at a temperature of 200° C. under 50–100 millimeters absolute pressure, to vaporize and separate volatile ingredients from the copolymer. The copolymer was separately withdrawn from the devolatilizing zone and was extruded as a strand into the atmosphere, then was cooled and cut into granular form. The copolymer was analyzed and found to consist of 19 percent by weight maleic anhydride and 81 percent styrene. It was a transparent brittle solid. It was soluble in pyridine, methyl ethyl ketone and xylene. A 10 weight percent solution of the copolymer in methyl ethyl ketone had an absolute viscosity of 3.83 centipoises.

(B) A charge of 200 grams of the copolymer of styrene and maleic anhydride prepared in part A above and 50.7 grams of isooctyl alcohol was placed in a glass reaction vessel equipped with a reflux condenser and stirrer. A charge of 200 grams of xylene as solvent and reaction medium was added, together with 5.07 grams of toluene sulfonic acid as catalyst. The resulting mixture was stirred and heated at a temperature of 110° C. for a period of 6 hours. The product was a clear brittle copolymer consisting of 80 mole percent styrene, 18.1 mole percent isooctyl acid maleate and 1.9 mole percent maleic anhydride.

EXAMPLE 4

(A) A mixture of 61.54 parts by weight of styrene and 12.67 parts of maleic anhydride in 25.89 parts of methyl isobutyl ketone as solvent was polymerized by procedure similar to that described in part A of Example 3 by heating the reaction mixture at a temperature of 235° C. in the coil reactor and maintaining the concentration of polymer in the liquid in the reactor at approximately 68.5 percent. The devolatilized product was obtained as a clear, brittle solid consisting of a copolymer of 12.87 mole percent maleic anhydride and 87.13 mole percent styrene. The copolymer had a viscosity of 0.67 centipoise as determined for a 10 weight percent solution of the copolymer in methyl ethyl ketone at 25° C.

(B) A charge of 100 grams of the copolymer prepared in part A above, together with 17.08 grams of isooctyl alcohol and 68 grams of xylene was placed in a glass reaction vessel and heated at a temperature of 60° C. for a period of 10 days. There was obtained a copolymer product consisting of 86.5 mole percent by weight styrene, 12.7 mole percent isooctyl acid maleate and 0.8 mole percent maleic anhydride.

EXAMPLE 5

A mixture of 80 percent by weight of styrene and 20 percent by weight of the half-ester of maleic acid and isooctyl alcohol, admixed with 25 parts by weight of methyl ethyl ketone per 100 parts by weight of the monomers, was fed in continuous manner to a recirculating coil reactor, having a capacity of about 1.5 pounds of material, at a rate of about 5 ounces per hour wherein it was heated at a temperature of 175° C. while continuously withdrawing material from the reactor at about the rate of feed thereto. The reaction was carried out so as to maintain the coil reactor full or substantially full of liquid, which was rapidly recirculated in the coil so as to quickly mix the feed material throughout the mass, and keep the concentration of polymer in the mass at about 38 percent by weight, while continuously withdrawing material from the coil reactor. The material withdrawn from the reactor was passed to a devolatilizing zone wherein it was heated at a temperature of about 220–240° C. under 90–135 millimeters absolute pressure to vaporize and remove volatile ingredients from the copolymer. The copolymer was separately withdrawn in a molten condition from the devolatilizing zone and was extruded as a strand into the atmosphere, then was cooled and cut to a granular form. The copolymer was a transparent solid consisting of 91.5 mole percent styrene and 7.3 mole percent isooctyl acid maleate, and 1.7 mole percent maleic anhydride. A 10 weight percent solution of the copolymer in methyl ethyl ketone had an absolute viscosity of 3.04 centipoises at 25° C. It was soluble in xylene.

EXAMPLE 6

In each of a series of experiments, a mixture consisting of 82.5 percent by weight of a copolymer of 75 percent styrene and 25 percent isooctyl acid maleate, and 17.5 percent of epoxy resin consisting essentially of a diglycidyl ether of bis-phenol A having an epoxide equivalent weight of about 260, was blended in a pebble mill with a butylated melamine formaldehyde resin in amount as stated in the following table, together with TiO₂ pigment and solvents of a kind and in proportions as set out in the recipe:

Ingredients: Parts by weight
Copolymer-epoxy resin mixture _____ 90–97
Melamine-formaldehyde resin _____ 10–3
$TiO_2$ _____ 36
Xylene _____ 34
Butyl alcohol _____ 8
Ethylene glycol monoethyl ether acetate ____ 11
Ethylene glycol monomethyl ether _____ 7
Aromatic hydrocarbon (B.P. 186–216° C.) __ 4

The ingredients were blended in the pebble mill to form a smooth composition having a viscosity of about 66 Krebs units. The coating was applied to 25 mil unpolished steel panels, then was dried and baked at a temperature of 350 F. for 30 minutes. The coating had good adherence as deterimned by bending a test panel around a ½-inch diameter mandrel. The coatings had high gloss and were resistant to straining by iodine, mustard, grease, and alkaline soap and detergent solutions. Table I identifies the experiments and gives the proportions of the mixture of the copolymer of styrene and isooctyl maleate and epoxy resin and the butylated melamine formaldehyde curing resin employed in making the coating compositions. The table also gives the frontal impact strength value determined for the coating. All of the coating compositions had good shelf-life upon storing.

TABLE I

| Run No. | Resin Starting Materials | | Baked Coating—Frontal Impact Strength, inch-pounds |
|---|---|---|---|
| | Copolymer-epoxy resin mixture, parts | Butylated melamine formaldehyde resin, parts | |
| 1 | 97 | 3 | 16 |
| 2 | 95 | 5 | 20 |
| 3 | 93 | 7 | 18 |
| 4 | 90 | 10 | 22 |
| 5 | 80 | 20 | 18 |

EXAMPLE 7

A charge of 37.5 grams of a xylene soluble copolymer of styrene and the half-ester of maleic acid and monobutyl ether of diethylene glycol, prepared by procedure similar to that employed in Example 2, and which copolymer consisted of 8.8 mole percent by weight of diethylene glycol monobutyl ether acid maleate, 2.2 mole percent maleic anhydride and 89 mole percent styrene, was dissolved in 37.5 grams of ethyl acetate. To this solution there was added 11.7 grams of an epoxy resin consisting of a diglycidyl ether of bisphenol-A having an epoxide equivalent weight of 325, 8.5 grams of butylated melamine-formaldehyde resin as a 65 weight percent solution of the resin dissolved in xylene, 25 grams of an aromatic solvent, 25 grams of dimethylformamide, and 54.7 grams of titanium dioxide as pigment. The resulting mixture was ground in a ball mill for about 16 hours, then was removed and strained. The product was a coating composition having a viscosity of about 60 Krebs units. The composition was sprayed onto test panels, was dried and then baked in an oven at 300° F. for 30 minutes to form a coating 2.4 mils thick. The baked coating had excellent resistance to xylene and after being immersed in a 1 percent by weight aqueous solution of "Tide" at 60° C. for a period of 200 hours showed few blisters rated No. 8 by ASTM standard rating (D714–56).

EXAMPLE 8

A coating composition was prepared by blending a solution consisting of 71.7 grams of a copolymer of 87.8 mole percent ortho-chlorostyrene and 12.2 mole percent of 2,4-dichlorobenzyl acid maleate, dissolved in 78.3 grams of methyl ethyl ketone, with 19.5 grams of an epoxy resin consisting of diglycidyl ether of bisphenol having an epoxide equivalent weight of 325, and 19.5 grams of butylated melamine-formaldehyde resin as a 65 weight percent solution of the resin in xylene, together with 50 grams of an aromatic solvent 50 grams of dimethylformamide and 101.3 grams of titanium dioxide, and grinding the mixture in a ball mill for a period of about 16 hours. The composition was sprayed onto test panels, was dried and baked in an oven at 300° F. for a period of 30 minutes, to form a coating 1.5 mils thick. The baked coating had excellent resistance to xylene and showed no blisters when immersed in an aqueous 1 weight percent solution of "Tide" for 200 hours at 60° C.

EXAMPLE 9

A coating composition was prepared by blending 54.3 grams of a 48.8 weight percent solution of a copolymer of 86.8 mole percent of styrene and 13.2 mole percent of isooctyl acid maleate dissolved in an aromatic solvent with 9.3 grams of an epoxy resin consisting of diglycidyl ether of tetrabromobisphenol having an epoxide equivalent weight of 373 and 6.8 grams of butylated melamine-formaldehyde resin as a 65 weight percent solution of the resin in xylene, together with 45 grams of and aromatic solvent, 45 grams of dimethylformamide and 43.7 grams of titanium dioxide as pigment, and ball milling the mixture for a period of 16 hours. The composition was sprayed onto test panels and was dried and baked in an oven at 300° F. for a period of 30 minutes to form a coating 2.9 mils thick. The baked coating had good resistance to xylene and after being immersed in a 1 weight percent aqueous solution of "Tide" at a temperature of 60° C. for a period of 200 hours showed medium blisters, it was rated No. 6 by ASTM standard.

EXAMPLE 10

In each of a series of experiments, a coating composition was prepared by blending 61.5 grams of a 55.3 weight percent solution of a copolymer of 88.5 mole perecnt of vinyltoluene and 11.5 mole percent of the halfester of maleic acid and monomethyl ether of tri-propylene glycol dissolved in xylene with other ingredients employing the recipes:

*Experiment A*

Ingredients: Parts by weight, grams
Copolymer solution _____ 61.5
Epoxy resin [1] _____ 5.7
Butylated melamine-formaldehyde resin [2] ____ 7.3
Aromatic solvent _____ 25.0
Dimethylformamide _____ 25.0
$TiO_2$ _____ 39.6

[1] A diglycidyl ether of bisphenol-A having an epoxide equivalent weight of 179.
[2] Butylated melamine-formaldehyde resin as a 65 weight percent solution of the resin in xylene.

Experiment B

Ingredients: Parts by weight, grams
- Copolymer solution — 61.5
- Epoxy resin [1] — 2.9
- Epoxidized soybean oil having five epoxy groups per molecule — 2.9
- Butylated melamine-formaldehyde resin — 6.0
- Aromatic solvent — 25.0
- Dimethylformamide — 25.0
- $TiO_2$ — 39.7

[1] A diglycidyl ether of bisphenol-A having an epoxide equivalent weight of 179.

Experiment C

Ingredients: Parts by weight, grams
- Copolymer solution — 61.5
- Epoxy resin [1] — 2.9
- Epoxy resin [2] — 2.9
- Butylated melamine-formaldehyde resin — 6.0
- Aromatic solvent — 25.0
- Dimethylformamide — 25.0
- $TiO_2$ — 39.7

[1] A diglycidyl ether of bisphenol-A having an epoxide equivalent weight of 179.
[2] Glycidyl ether of cashew nut oil.

The ingredients were ball milled for a period of 16 hours to form a smooth uniform composition. The composition was sprayed onto test panels and was dried and was baked in an oven at 300° F. for 30 minutes to form a finished coating having a thickness as stated below. The coatings had good resistance to impact and excellent resistance to swelling or peeling in contact with xylene. The thickness of the baked coating and the properties determined therefor were as follows:

TABLE II

| Experiment No. | Film Thickness, mils | Front Impact Strength in lbs. | 200 Hours in 1 Percent Tide Solution; ASTM Rating | |
|---|---|---|---|---|
| | | | Rating | Blisters |
| A | 2.2 | 30 | No. 6 | Medium. |
| B | 1.9 | 15 | No. 6 | Do. |
| C | 1.7 | 30 | No. 8 | Do. |

EXAMPLE 11

A coating composition was prepared by blending together 514 grams of a 48.6 percent by weight solution of a copolymer of 86.8 mole percent of styrene and 13.2 mole percent of isooctyl acid maleate dissolved in xylene, 30 grams of an isobutylated melamine-formaldehyde resin as a 50 weight percent solution of the resin in isobutyl alcohol, 33 grams of 3,4-epoxy-6-methyl cyclohexyl-methyl-3,4-epoxy-6-methylcyclohexane carboxylate (a cycloaliphatic epoxy resin), 41 grams of monomethyl ether of ethylene glycol 50 grams of normal butyl alcohol and 300 grams of titanium dioxide as pigment. The ingredients were ground in a ball mill for a period of 16 hours, then were thinned by adding 29.5 grams of an aromatic solvent, and 78.5 grams of Cellosolve acetate. The resulting mixture was blended to a uniform composition. The composition contained the resinous components in the proportions of 80 percent by weight of the styreneisooctyl acid maleate, 10 percent of the epoxy resin and 9.5 percent of the isobutylated melamine-formaldehyde resin. The composition contained 13.2 parts by weight of the epoxy resin per 100 parts by weight of the styrene-isooctyl acid maleate copolymer. The composition was applied as a layer by means of a wire-wound rod to 25 mil unpolished steel test panels and was dried and was baked in an oven at 300° F. for a period of 30 minutes to form a film 1.5 mils thick. The baked film had good resistance to xylene, withstood a 10 inch pound frontal impact test without cracking, it was rated as No. 5 blisters, few in size by ASTM standard.

EXAMPLE 12

A coating composition was prepared by blending 15.3 grams of a 65.2 weight percent solution in xylene of a copolymer of 83 mole percent of styrene and 17 mole percent of a half ester of maleic acid and a branched chain saturated aliphatic alcohol containing 21 carbon atoms in the molecule, which copolymer had a viscosity characteristic of 1.07 centipoises as determined for a 10 weight percent solution of the copolymer in methyl ethyl ketone at 25° C., 1.9 grams of diglycidyl ether of bisphenol-A having an epoxide equivalent weight of 179, together with 13.8 grams of xylene and 2 grams of butylated melamine-formaldehyde resin as a 65 weight percent solution of the resin in xylene. The composition was a clear solution. It was cast onto tin plated sheet iron test panels and was dried and was baked in an oven at a temperature of 300° F. for 30 minutes to form a film 2 mils thick. The baked coating had good resistance to xylene. The coating composition had good shelf life. It was stored at room temperature in a closed container for a period of 180 days without gelling.

What is claimed is:

1. A liquid coating composition comprising from 80 to 90 percent by weight of an organic film-forming material consisting of a mixture of a xylene soluble copolymer of from 75 to 90 mole percent of styrene and from 25 to 10 mole percent of isooctyl acid maleate, and an epoxy resin consisting of a diglycidyl ether of bisphenol A having an epoxide equivalent weight of from 170 to 400 in proportions corresponding to from 0.9 to 1.1 chemically equivalent proportions of the epoxy resin per carboxylic acid group in the copolymer, and from 20 to 5 percent by weight of melamine-formaldehyde-monohydric alcohol condensate, dissolved in a volatile organic solvent therefor and further containing a pigment.

2. A coating composition of claim 1 in which the melamine-formaldehyde-monohydric alcohol condensate is melamine-formaldehyde-butyl alcohol condensate and the pigment is titanium dioxide.

References Cited by the Examiner

UNITED STATES PATENTS

| | | | |
|---|---|---|---|
| 2,798,062 | 7/1957 | Contois | 260—78.5 |
| 2,967,162 | 1/1961 | Vasta | 260—21 |
| 3,008,911 | 11/1961 | Douglas | 260—23 |
| 3,027,357 | 3/1962 | Stickle | 260—78.3 |
| 3,046,246 | 7/1962 | Muskat | 260—837 |

OTHER REFERENCES

Federation of Societies for Paint Technology, Official Digest, vol. 35, No. 462, July 1963, p. 649 relied upon.

LEON J. BERCOVITZ, *Primary Examiner.*

DONALD E. CZAJA, F. McKELVEY,
*Assistant Examiners.*